United States Patent [19]

Theobald

[11] 4,372,764

[45] Feb. 8, 1983

[54] METHOD OF PRODUCING GASEOUS OXYGEN AND A CRYOGENIC PLANT IN WHICH SAID METHOD CAN BE PERFORMED

[75] Inventor: Alan Theobald, Purley, England

[73] Assignee: Air Products and Chemicals, Inc., Allentown, Pa.

[21] Appl. No.: 283,593

[22] Filed: Jul. 15, 1981

[30] Foreign Application Priority Data

Jul. 22, 1980 [GB] United Kingdom ............... 8023899

[51] Int. Cl.³ .............................................. F25J 3/04
[52] U.S. Cl. ........................................ 62/13; 62/18; 62/41; 62/38
[58] Field of Search ...................... 62/13–15, 62/41, 29, 38, 39, 18

[56] References Cited

U.S. PATENT DOCUMENTS

| | | | |
|---|---|---|---|
| 2,873,583 | 2/1959 | Potts et al. ............................... | 62/14 |
| 3,216,206 | 11/1965 | Kessler ..................................... | 62/30 |
| 3,426,543 | 2/1969 | Becker ...................................... | 62/30 |
| 3,967,464 | 7/1976 | Cormier et al. ......................... | 62/18 |

*Primary Examiner*—Norman Yudkoff
*Attorney, Agent, or Firm*—Geoffrey L. Chase; E. Eugene Innis; James C. Simmons

[57] ABSTRACT

In a pumped liquid oxygen plant the liquid oxygen is vaporized and warmed against part of the feed air which is compressed in compressor (15) and divided into a first sub-stream (20) at 56.4 bars A and a second sub-stream (16) at 42 bars A. The first sub-stream (20) is cooled against the evaporating oxygen in the heat exchanger (17). It is then expanded at valve (21) and the largely (on a molar basis) liquid product is fed to the high pressure column (10) through pipe (22). The second sub-stream is cooled in heat exchanger (17) and is then expanded in generator loaded expander (18). The cold gas in then used to cool the first sub-stream in heat exchanger (17) and is recycled to the compressor (15).

5 Claims, 1 Drawing Figure

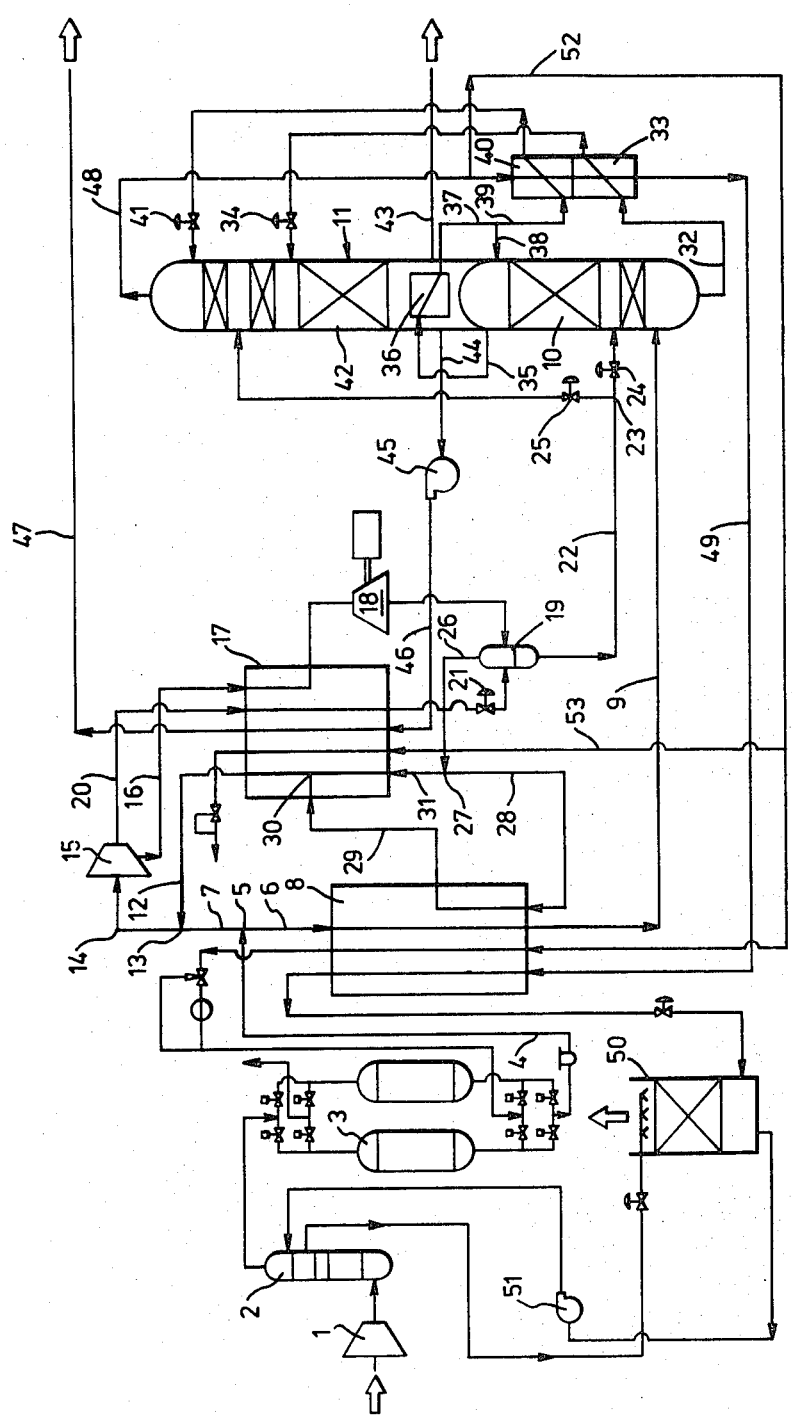

METHOD OF PRODUCING GASEOUS OXYGEN AND A CRYOGENIC PLANT IN WHICH SAID METHOD CAN BE PERFORMED

This invention relates to a method of producing gaseous oxygen and to a cryogenic plant in which said method can be performed.

In our U.K. patent application Ser. No. 80 19739 filed June 17, 1980 we have described a method for producing gaseous oxygen which comprises the steps of fractionating dry compressed air in a double distillation column having a high pressure column operating at between 5 and 9 bars absolute and a low pressure column operating at between 1.3 and 3 bars absolute, wherein liquid oxygen is withdrawn from the low pressure column, is pressurized and is evaporated against a stream of substantially pure nitrogen which has been removed from the top of the high pressure column, compressed and divided into a first and second sub-stream. The first sub-stream is cooled against the vaporizing liquid oxygen and is then expanded to produce a mainly (on a molar basis) liquid product at least part of which is returned to the high pressure column as reflux. The second sub-stream is cooled, expanded in an expander, used to assist cooling the first sub-stream and then recycled, at least in part, to the compressor.

In order to operate economically the nitrogen must be compressed to a relatively high pressure. Thus, if the liquid oxygen pressure leaving the pump is 69 bars A, the nitrogen should ideally be compressed to, in the case of the first sub-stream 80 bars A in the case of the second sub-stream 41 bars A.

We have now found that unless compressed gaseous nitrogen is required it is advantageous to cool at least part of the feed air rather than the nitrogen against the vaporizing oxygen since the feed air has to be compressed to a lower pressure than the nitrogen to obtain a satisfactory transfer of refrigeration from the cold oxygen stream to the feed air. This lower pressure results in lower capital investment. However, the energy requirements of the final plant are approximately equal to those of the plant described in our previous patent application since the cold feed air cannot be used as reflux in the high pressure column.

According to the present invention there is provided a method for producing gaseous oxygen which method comprises compressing feed air to between 5 and 10 bars absolute, passing said feed air through a molecular sieve adsorber to remove carbon dioxide and water vapor therefrom, fractionating the feed air in a distillation unit comprising a high pressure column operating at between 5 and 9 bars absolute and a low pressure column operating at between 1.3 and 3 bars absolute, withdrawing liquid oxygen from said low pressure column, pressurizing said liquid oxygen, vaporizing said liquid oxygen and warming the vapour, characterised in that at least part of said feed air from said molecular sieve adsorber is compressed to an elevated pressure in a recycle compressor and is divided into a first sub-stream and a second sub-stream, said first sub-stream is cooled by said liquid oxygen and expanded to produce (on a molar basis) a mainly liquid stream which is introduced into said high pressure column, and/or said low pressure column, and said second sub-stream is cooled, expanded in an expander, used to assist in cooling said first sub-stream and returned, at least in part, to said recycle compressor.

The second sub-stream may be cooled by the gaseous oxygen as it warms or may be cooled in a separate and distinct heat exchanger against, for example, cool gas leaving the expander.

Preferably, said first sub-stream is compressed to a higher pressure than said second sub-stream.

Advantageously, said first sub-stream is compressed to between 35 and 65 bars A, and said second sub-stream is compressed to between 35 and 45 bars A.

The present invention also provides a cryogenic plant comprising a compressor for compressing feed air, at least one molecular sieve adsorber for adsorbing carbon dioxide and water vapour from said feed air, a distillation unit comprising a high pressure column and a low pressure column for distilling air, a pump for pressurizing, in use, liquid oxygen from said low pressure column, and a first heat exchanger in which pressurized liquid oxygen can be vaporized and warmed, characterised in that said cryogenic plant further comprises a recycle compressor having an inlet arranged to receive air from said molecular sieve adsorber, and first and second outlets, the first of which communicates with said first heat exchanger and an expansion valve downstream of said first heat exchanger whereby, in use, compressed air can be cooled in said first heat exchanger, expanded to produce (on a molar basis) a mainly liquid product, and introduced into said high pressure column and/or said low pressure column, and the second of which outlets is connected to a second heat exchanger and to an expander downstream of said heat exchanger whereby, in use, compressed air can be cooled and expanded in said expander, and a conduit to carry, in use, cold expanded air to the inlet of said recycle compressor via said first heat exchanger wherein it assists in cooling the compressed gas from said first outlet.

Preferably, the first and second heat exchangers are incorporated in a single heat exchanger.

The present invention is particularly advantageous in cryogenic plants providing in excess of 50 Tonnes a day of oxygen at pressures in excess of 30 bars A.

For a better understanding of the invention reference will now be made, by way of example, to the accompanying drawing which is a simplified flowsheet of a cryogenic plant in accordance with the invention.

Referring to the drawing, air is compressed to 6.7 bars absolute (bars A) in compressor 1 and cooled to 7° C. in aftercooler 2. The compressed air is then passed through molecular sieve adsorber 3 where carbon dioxide, water vapour and higher hydrocarbons are adsorbed. The clean compressed air is then passed through pipe 4 and is divided into a first stream 6 and a second stream 7. Approximately 78% (by volume) of the clean compressed air comprises the first stream 6 which is cooled to its dewpoint in heat exchanger 8. The cooled air stream is then passed through conduit 9 into the high pressure column 10 of a double distillation column 11.

The second stream 7 is joined by a nitrogen rich stream 12 at junction 13 and the combined stream 14 is introduced into a two stage recycle compressor 15.

Approximately 69% of the combined stream is passed through conduit 16 as a second sub-stream at 42 bars to a heat exchanger 17 where it is cooled to −123° C. before being expanded to 6.7 bars A in generator loaded expander 18. The expanded stream is then introduced into a phase separator 19. The balance of the combined stream is passed through conduit 20 as a first sub-stream at 55 bars A to heat exchanger 17 where it is cooled to approximately −171° C. It is then expanded to 6.7 bars A at valve 21 and the two phase mixture thus formed is fed to phase separator 19.

Liquid from the phase separator 19 passes through pipe 22 to junction 23 where it is divided into a fraction which is expanded to 6.3 bars A at valve 24 before entering the high pressure column 10 and a fraction which is expanded to 1.4 bars A at valve 25 before entering the low pressure column 42.

Vapour from the phase separator 19 passes through pipe 26 to junction 27 where it is divided into two streams. One stream 28 is warmed in heat exchanger 8 and then passes through pipe 29 to junction 30 where it meets the other stream 31 from junction 27. The combined stream is further warmed and leaves the heat exchanger 17 as the nitrogen rich stream 12.

Crude liquid oxygen from the bottom of the high pressure column 10 passes through pipe 32 into heat exchanger 33 where it is sub-cooled before being expanded at valve 34 and introduced into low pressure column 42 at 1.4 bars A. The gaseous nitrogen fraction leaves the top of high pressure column 10 through conduit 35 and is condensed in reboiler 36. The liquid nitrogen leaves the reboiler 36 through pipe 37 and part is passed through pipe 38 to the high pressure column 10 as reflux whilst the balance passes through pipe 39 to heat exchanger 40 where it is sub-cooled before being expanded at valve 41 and introduced into low pressure column 42 at 1.4 bars A.

A small portion of liquid oxygen is withdrawn from the bottom of the low pressure column 42 through pipe 43 and is passed to a liquid oxygen storage tank (not shown). The remainder of the liquid oxygen passes through pipe 44 to pump 45 where it is pressured to 82 bars A. The liquid oxygen is then passed through pipe 46 to heat exchanger 17 which it leaves through pipe 47 as a gas at approximately 16° C.

Of the remaining streams, impure nitrogen leaves the top of the low pressure column 42 through pipe 48. The majority of the impure nitrogen is then warmed in heat exchangers 40 and 33 before passing through pipe 49 to heat exchanger 8 which it leaves at 10° C. The impure, but dry, nitrogen is then bubbled through a water tower 50 where it cools the water as it becomes saturated. The water so cooled is delivered by pump 51 to the top section of aftercooler 2 where it provides the final stage of cooling of the air. The major part of the cooling duty in aftercooler 2 is provided by the main cooling water circulation system (not shown). The balance of the impure nitrogen passes through pipe 52 and the majority is warmed in heat exchanger 8. It is then used for regenerating the molecular sieve adsorbers 3. The remainder of the impure nitrogen is passed through pipe 53 to heat exchanger 17 where it is warmed before being used as purge gas.

It should be noted that the present arrangement is only suitable for a cryogenic plant incorporating a molecular sieve adsorber as opposed to a cryogenic plant incorporating reversible heat exchangers for removing carbon dioxide and water vapour.

I claim:

1. A method for producing gaseous oxygen which method comprises compressing feed air to between 5 and 10 bars absolute, passing said feed air through a molecular sieve adsorber to remove carbon dioxide and water vapour therefrom, fractionating the feed air in a distillation unit comprising a high pressure column operating at between 5 and 9 bars absolute and a low pressure column operating at between 1.3 and 3 bars absolute, withdrawing liquid oxygen from said low pressure column, pressurizing said liquid oxygen, vaporizing said liquid oxygen and warming the vapour, characterised in that said feed air from said molecular sieve adsorber is divided into a first stream (6), which is cooled by heat exchange against process streams and passed to the high pressure column as feed, and a second stream (7) which is compressed to an elevated pressure in a recycle compressor and is divided into a first sub-stream and a second sub-stream, said first sub-stream is cooled by said liquid oxygen and expanded to produce (on a molar basis) a mainly liquid stream which is phase separated, in which the liquid phase is introduced into said high pressure column and/or said low pressure column, and said second sub-stream is cooled, expanded in an expander, phase separated, used to assist in cooling said first sub-stream and returned, at least in part, to said recycle compressor.

2. A method according to claim 1, characterised in that said first sub-stream is compressed to a higher pressure than said second sub-stream.

3. A method according to claim 1 or 2, characterised in that said first sub-stream is compressed to between 35 and 65 bars A, and said second sub-stream is compressed to between 35 and 45 bars A.

4. A cryogenic plant comprising a compressor for compressing feed air, at least one molecular sieve adsorber for adsorbing carbon dioxide and water vapour from said feed air, a distillation unit comprising a high pressure column and a low pressure column for distilling air, a pump for pressurizing, in use, liquid oxygen from said low pressure column, and a first heat exchanger in which pressurized liquid oxygen can be vaporized and warmed, characterized in that said cryogenic plant further comprises a first conduit for passing a portion of the feed air to the high pressure column, a second conduit for introducing another portion of the feed air and a recycled stream into the distillation unit, a recycle compressor having an inlet arranged to receive air from said molecular sieve adsorber, and first and second outlets, the first of which communicates with said first heat exchanger and an expansion valve downstream of said first heat exchanger whereby, in use, compressed air can be cooled in said first heat exchanger, expanded to produce (on a molar basis) a mainly liquid product, phase separated and the liquid phase introduced into said high pressure column and/or said low pressure column, and the second of which outlets is connected to a second heat exchanger and to an expander downstream of said heat exchanger whereby, in use, compressed air can be cooled, expanded in said expander and phase separated, a phase separator for separating the air from said first and second outlets into a liquid feed to the distillation unit and cold expanded recycle air, and a conduit to carry, in use, cold expanded recycle air to the inlet of said recycle compressor via said first heat exchanger wherein it assists in cooling the compressed gas from said first outlet.

5. A cryogenic plant according to claim 4, charactised in that said first and second heat exchangers are incorporated in a single heat exchanger.

* * * * *